(12) United States Patent
Crisler et al.

(10) Patent No.: US 10,523,930 B2
(45) Date of Patent: Dec. 31, 2019

(54) MITIGATING BINOCULAR RIVALRY IN NEAR-EYE DISPLAYS

(71) Applicant: Microsoft Technology Licensing, LLC, Redmond, WA (US)

(72) Inventors: Matthew Calbraith Crisler, Redmond, WA (US); Robert Thomas Held, Seattle, WA (US); Bernard Charles Kress, Redwood City, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 112 days.

(21) Appl. No.: 15/859,113

(22) Filed: Dec. 29, 2017

(65) Prior Publication Data

US 2019/0208190 A1 Jul. 4, 2019

(51) Int. Cl.
*H04N 13/398* (2018.01)
*H04N 13/383* (2018.01)
(Continued)

(52) U.S. Cl.
CPC ....... *H04N 13/398* (2018.05); *G02B 27/0081* (2013.01); *G02B 27/0093* (2013.01); *G02B 27/017* (2013.01); *G02B 27/0172* (2013.01); *H04N 13/144* (2018.05); *H04N 13/344* (2018.05); *H04N 13/383* (2018.05); *G02B 2027/011* (2013.01); *G02B 2027/014* (2013.01); *G02B 2027/0118* (2013.01);
(Continued)

(58) Field of Classification Search
CPC .. H04N 13/398; H04N 13/383; H04N 13/344; H04N 13/144; G02B 27/0172; G02B 2027/011; G02B 2027/0134; G02B 2027/014; G06F 3/011; G06F 3/013
See application file for complete search history.

(56) References Cited

U.S. PATENT DOCUMENTS 9,116,337 B1 * 8/2015 Miao .................. G02B 27/0172
9,202,443 B2 12/2015 Perez et al.
(Continued)

OTHER PUBLICATIONS

"An Eye-tracked Oculus Rift", http://doc-ok.org/?p=1021, Published on: Jun. 2, 2014, 30 pages.
(Continued)

*Primary Examiner* — Stephen G Sherman
(74) *Attorney, Agent, or Firm* — Alleman Hall Creasman & Tuttle LLP

(57) ABSTRACT

Examples are disclosed herein related to reducing binocular rivalry in a near-eye display. One example provides a head-mounted display device having a near-eye display system configured to output a first-eye image to a first eyebox and a second-eye image to a second eyebox. The head-mounted display device is configured to receive an input of a three-dimensional (3D) location of a pupil of a first eye and a 3D location of a pupil of a second eye relative to the near-eye display system, based upon the 3D location of the pupil of the first eye and of the second eye, determine a location at which the pupil of the first eye begins to exit the first eyebox, and attenuate a luminance of the second-eye image at a location in the second-eye image based upon the location at which the pupil of the first eye begins to exit the first eyebox.

20 Claims, 7 Drawing Sheets

(51) Int. Cl.
*H04N 13/344* (2018.01)
*G02B 27/00* (2006.01)
*H04N 13/144* (2018.01)
*G02B 27/01* (2006.01)

(52) U.S. Cl.
CPC ............... *G02B 2027/0132* (2013.01); *G02B 2027/0134* (2013.01); *G02B 2027/0138* (2013.01); *G02B 2027/0187* (2013.01)

(56) References Cited

U.S. PATENT DOCUMENTS

| | | | |
|---|---|---|---|
| 9,207,455 B2 | 12/2015 | Bickerstaff et al. | |
| 9,230,473 B2 | 1/2016 | Margolis et al. | |
| 9,489,044 B2 | 11/2016 | Fateh | |
| 9,494,794 B2 | 11/2016 | El-Ghoroury et al. | |
| 2013/0285885 A1 | 10/2013 | Nowatzyk et al. | |
| 2014/0140654 A1* | 5/2014 | Brown | G02F 1/29 385/10 |
| 2016/0077345 A1 | 3/2016 | Bohan et al. | |
| 2017/0038590 A1 | 2/2017 | Jepsen | |
| 2017/0123209 A1 | 5/2017 | Spitzer et al. | |
| 2017/0123526 A1 | 5/2017 | Trail et al. | |
| 2017/0219829 A1* | 8/2017 | Bailey | G02B 27/0172 |
| 2017/0293146 A1 | 10/2017 | Nicholls et al. | |
| 2017/0315357 A1* | 11/2017 | Katano | G02B 26/02 |

OTHER PUBLICATIONS

"Magic Leap: Founder of Secretive Start-Up Unveils Mixed-Reality Goggles" RollingStone Magazine. Dec. 20, 2017. 24 pages. Available at: https://www.rollingstone.com/glixel/features/lightwear-introducing-magic-leaps-mixed-reality-goggles-w514479.

"International Search Report and Written Opinion Issued in PCT Application No. PCT/US18/063511", dated Mar. 22, 2019, 13 Pages.

\* cited by examiner

MITIGATING BINOCULAR RIVALRY IN NEAR-EYE DISPLAYS

BACKGROUND

Near-eye display devices, such as a head-mounted display device, may be configured to present fully immersive virtual reality experiences, or augmented reality experiences in which virtual content is overlaid onto a see-through view of a real-world background.

SUMMARY

Examples are disclosed that relate to reducing binocular rivalry in a near-eye display. One example provides a head-mounted display device comprising a near-eye display system configured to output a first-eye image to a first eyebox and a second-eye image to a second eyebox. The head-mounted display device further comprises a logic device and a storage device comprising instructions executable by the logic device to receive an input of a three-dimensional (3D) location of a pupil of a first eye and a 3D location of a pupil of a second eye relative to the near-eye display system, based upon the 3D location of the pupil of the first eye and the 3D location of the pupil of the second eye determine a location at which the pupil of the first eye begins to exit the first eyebox, and attenuate a luminance of the second-eye image at a location in the second-eye image based upon the location at which the pupil of the first eye begins to exit the first eyebox.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Near-eye displays (such as head-mounted displays) having relatively larger fields of view may offer more immersive augmented and/or virtual reality experiences compared to those with relatively smaller fields of view. In a binocular near-eye display, a left image viewable by a left eye is displayed within a left eyebox and a right image viewable by a right eye is displayed within a right eyebox. The size of an eyebox is influenced by an interpupillary distance (IPD) range of a target group of users and by a desired field of view. For a wide-angle near-eye display, a large eyebox for each eye may be required in order for all users of a population of users to see the entire displayed region at all times. This may involve the use of large and costly optics. To help avoid such optics, a head-mounted display system may be designed such that a significant percentage (e.g. 95-98%) of IPDs will fall fully within the eyebox across the full field of view. In such a design, most people will not experience vignetting. However, people with IPDs that are either very large or very small compared to the population as a whole may experience some vignetting in a left-eye or right-eye image when gazing at virtual imagery displayed near or at an edge of the field of view, or when looking well past the edge of the field of view (e.g. to look at a real-world object). Where the vignetting is in the image for one eye and not the other eye, or otherwise dissimilar between the images for each eye, the visual experience may lead to a possibly distracting binocular rivalry effect.

Figure 1:
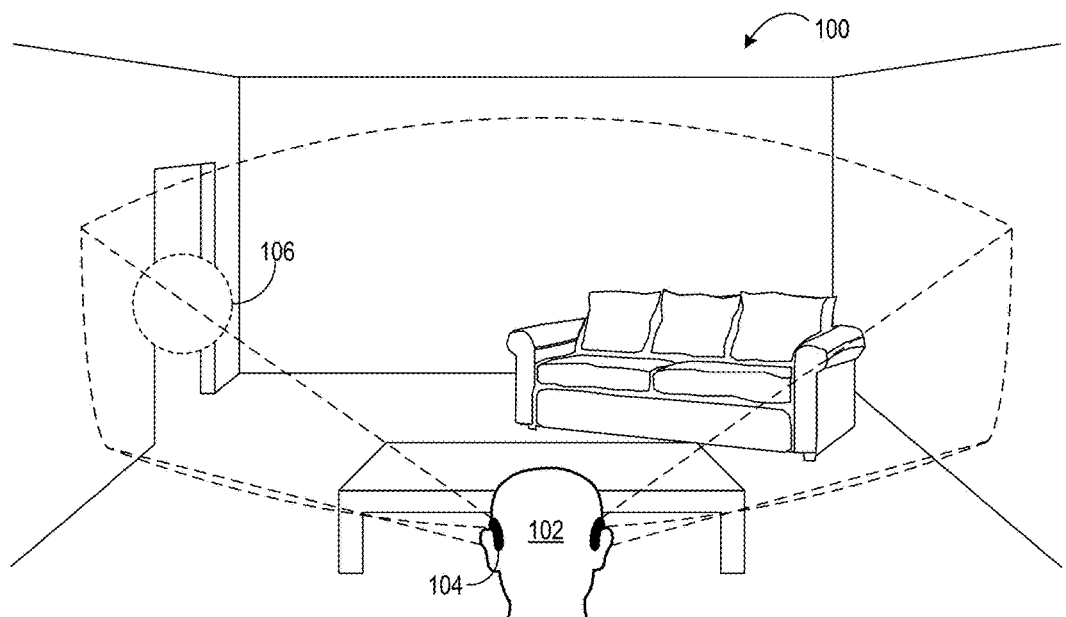
FIG. 1 shows an example use scenario for a near-eye display device.
Figure 2:
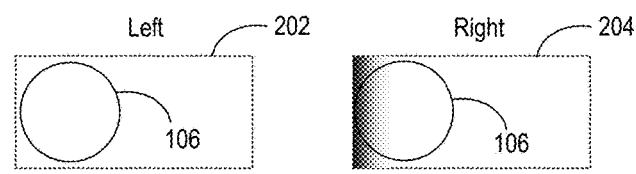
FIG. 2 shows example views of a left-eye image and a right-eye image of a virtual object, and illustrates vignetting of the right-eye image.

FIG. 1 shows an example use scenario 100 in which a viewer 102 wearing a near-eye display device 104 is viewing a displayed virtual object 106 in an augmented reality experience. The virtual object 106 is displayed in a location in a far-left region of the display field of view. Referring to FIG. 2, due to the locations of the user's pupils relative to the corresponding eyeboxes, a left-eye image 202 of the virtual object 106 is fully visible in the left eye field of view 202, but a left side of right-eye image 204 of the virtual object 106 is partially cut off. This may occur when the right eye pupil crosses fully beyond an edge of the right eyebox. In instances where the pupil only partially leaves the eyebox, the affected side of the image will be visible, but appear dimmer. In either case, the resulting inconsistency between what is perceived by the left eye and the right eye may be distracting or uncomfortable to view. It will be understood that vignetting may occur on any edge of either a left or right eye image, depending upon the location of each pupil relative to its corresponding eyebox.

Accordingly, examples are disclosed herein that relate to attenuating a luminance of a portion of an image for a first eye based on a location of a pupil of a second eye with respect to an edge of the eyebox for the second eye. Attenuating a luminance of an image in this manner may help the appearance of the image for the first eye to more closely match the image perceived by the second eye and thereby mitigate any binocular rivalry that may otherwise arise from the differences between the images.

A location at which a pupil will begin to cross an edge of an eyebox may be determined based upon data regarding a three-dimensional location of the pupil relative to the near-eye display system. In some examples, a three-dimensional location of the pupil relative to a near-eye display system may be determined by calibration using an eye-tracking system, e.g. at a beginning of a use session. Such a calibration may be updated periodically during a use session, for example, to correct for any positional shifting of the near-eye display device on a user's head during use.

Any suitable method may be used by an eye tracking system to determine a three-dimensional location of a pupil of an eye. For example, an eye-tracking system may direct light from a plurality of eye-tracking light sources toward the eye, acquire image data of the eye, detect a pupil image and images of reflections of the eye-tracking light sources from the user's eye in the image data, and then fit the observed locations of the pupil relative to the eye tracking light source reflections to a three-dimensional eye model to determine the three-dimensional pupil location. In other examples, a three-dimensional location of a pupil may be determined via an estimation based on a user-provided IPD and assumed eye relief values. In yet other examples, non-image-based eye trackers may also be used, such as an eye tracker that detects extraocular muscle signals.

Figure 3:
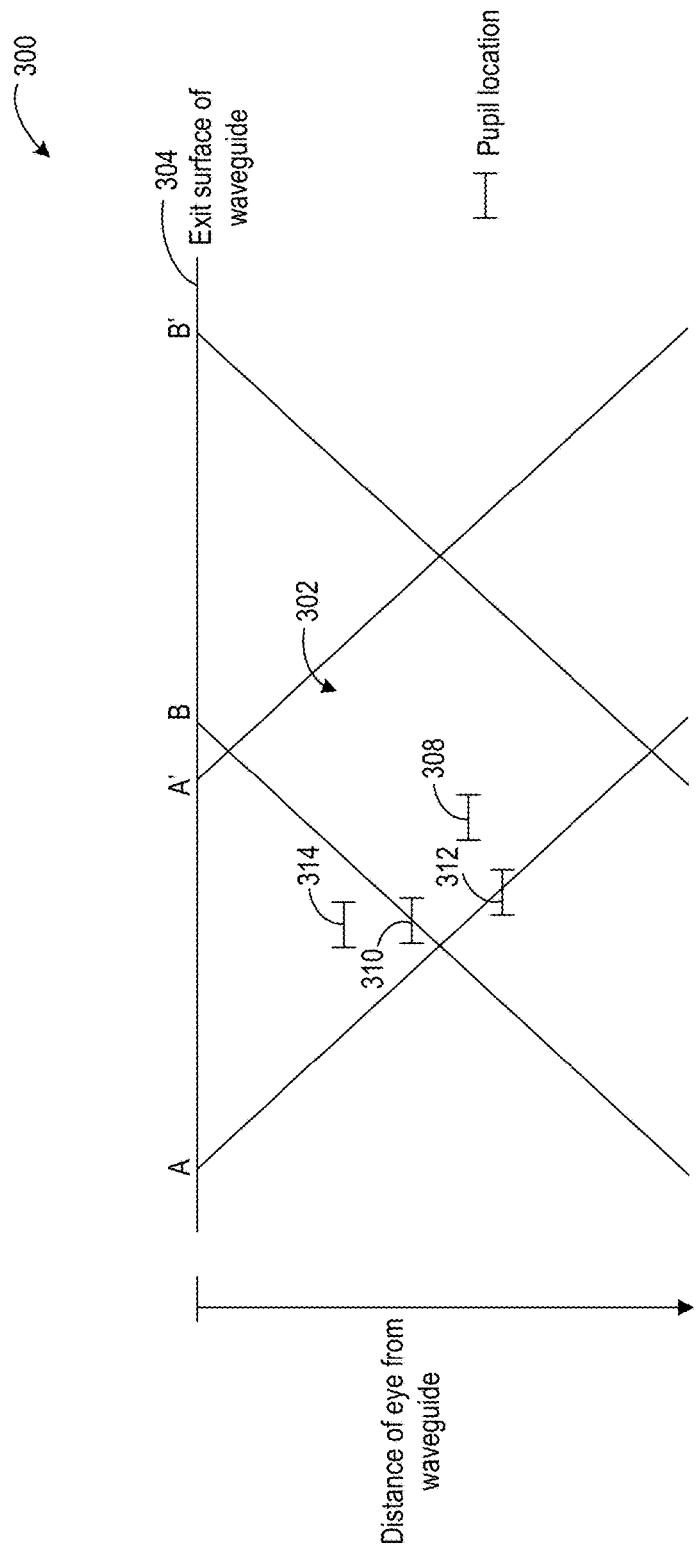
FIG. 3 schematically illustrates an example eyebox model.

The determined three-dimensional location of each eye may be compared to an eyebox model to determine the location at which the pupil will start to exit the eyebox. FIG. 3 shows an example eyebox model 300 illustrating an eyebox 302 as a diamond-shaped area in space. It will be understood that the eyebox also comprises a third dimension in a direction normal to the page. In this model, an exit surface of the waveguide is represented by 304. Lines A and A' represent a region in space between which one edge of a display field of view is viewable, and lines B and B' represent a region between which the other edge of the display field of view is viewable.

FIG. 3 also shows several example pupil locations within the model. First, pupil 308 (represented by a horizontal bar indicating an example pupil diameter) is fully within the eyebox 302, and thus would experience no vignetting. Pupil 310 is positioned such that it experiences no vignetting at the edge of the field of view represented by lines A-A', but does experience vignetting at the edge of the field of view represented by lines B-B'. Because pupil 310 crosses line B, the edge of the field of view represented by lines B-B' would appear dimmer than other portions of the image. Pupil 312 is positioned such that it experiences vignetting at the edge of the field of view represented by lines A-A', but no vignetting at the edge of the field of view represented by lines B-B'. Because pupil 312 crosses line A, the edge of the field of view represented by lines A-A' would appear dimmer. Pupil 314 is positioned such that it receives no light from the edge of the field of view represented by lines B-B'. As such, the viewed image would appear to fade and disappear before reaching the edge of the field of view represented by lines B-B'. Knowledge of the three-dimensional location of a pupil thus allows locations at which the pupil of the eye would leave the eyebox to be determined by comparing the three-dimensional location of the pupil to the eyebox model. Based upon this determination, a corresponding portion of an image displayed to the other eye may be attenuated to reduce apparent differences between the two images.

As shown in FIG. 3, as a pupil crosses out of an eyebox, less and less light from that edge enters the pupil. Thus, the eye perceives a roll-off in intensity or luminance of the displayed image at that edge. The resulting roll-off in luminance may be modeled mathematically using the eyebox model 300 to calculate a roll-off profile for the impacted edge of the field of view. The determined roll-off profile then may be used to attenuate luminance in the edge of the image for the un-impacted eye. The steepness of the roll-off is a function of the pupil diameter, where a smaller diameter pupil perceives a steeper roll-off. In some examples, a fixed roll-off profile may be used based, for example, on a determined or estimated average pupil diameter across a population. In other examples, various methods may be used to determine or estimate a pupil diameter in real-time for dynamically determining a roll-off profile.

As mentioned above, in some examples, a near-eye display system may utilize eye tracking to determine in real time when a pupil is exiting the eyebox, and dynamically adjust an image displayed to the other eye in response. This is referred to herein as dynamic adjustment. In other examples, a static adjustment may be used in which user-provided data or a calibration process is used instead of real-time eye tracking to determine an adjustment to apply to an image. Applying a static adjustment will reduce a size of the field of view of the near-eye display device for some users, such as for those with particularly large or small IPDs, but may be simpler to implement than dynamic adjustment, may use less power, and may be used where eye tracking is not available.

Dynamic adjustment may provide real-time, frame-by-frame matching of left and right eye images, and thus may result in a more accurate image adjustment than static methods. Further, as mentioned above, in some examples, a pupil diameter may be tracked in addition to a pupil location to help more accurately determine when the pupil begins to leave the eyebox. In yet other examples, eye motion prediction may be used to help inform eye tracking.

In some examples, image adjustment may be performed by reducing the luminance in the corresponding region of the image for one eye to fully match the reduction in luminance perceived by the other eye. In other examples, the luminance may be adjusted to a lesser extent than that perceived by the other eye, but to a sufficient extent to mitigate a sensation of binocular rivalry, (e.g. as determined based on data from a large sample of users, or to a level set as a user preference).

Figure 4:
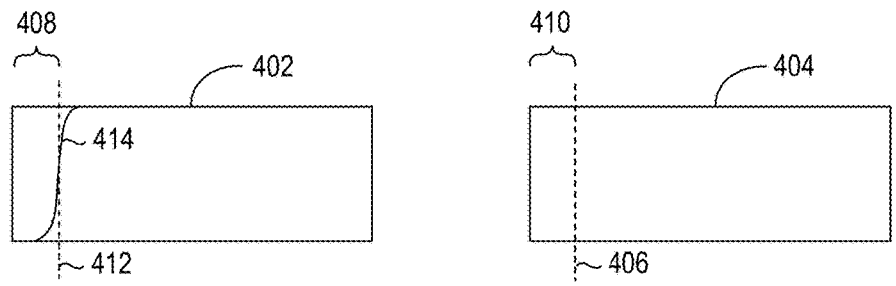
FIG. 4 schematically illustrates an example roll-off profile useable to attenuate luminance in an image.

FIG. 4 schematically illustrates an example of a left-eye image 402 and a right-eye image 404, where each image 402 and 404 represents a full field of view. In this example, it is determined that a user's eye will be approximately halfway past the edge of the eyebox at a location illustrated by dotted line 406. Accordingly, a corresponding region 408 of the left-eye image is attenuated in luminance.

As the right pupil exits the eyebox in this example, the right-eye image would be perceived as having a roll-off in luminance. Thus, the luminance of the left-eye image is adjusted to roll off toward the left edge of the image in a similar manner. In some examples, the roll-off profile 414 of the attenuated image may be centered such that the 50% luminance point intersects line 412, so that both eyes would perceive an approximately 50% luminance of left and right images at this point, while the roll-off profile may be centered differently in other examples. In the depicted example, the intensity is reduced to zero toward the left side of the left-eye image. This may occur, for example, where the pupil of the other eye has fully exited the corresponding side of the eyebox. In other examples, as mentioned above, the luminance may be attenuated to a level that is greater than 0%, but sufficiently reduced as to avoid the perception of distracting binocular rivalry.

Figure 5:
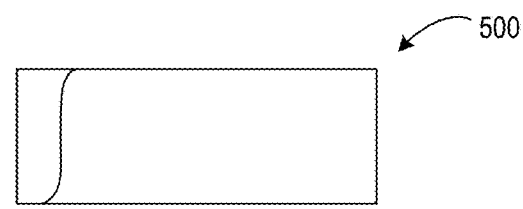
FIG. 5 schematically illustrates an example roll-off profile for a relatively smaller diameter pupil.
Figure 6:
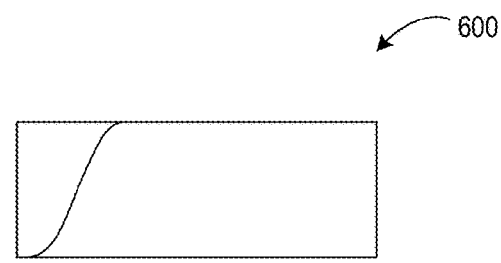
FIG. 6 schematically illustrates an example roll-off profile for a relatively larger diameter pupil.

As mentioned above, the steepness of the roll-off in luminance seen by an eye exiting an eyebox is dependent upon a pupil size. As such, in some examples, a near-eye display system may determine a pupil size (e.g. pupil diameter) and pupil center location, and determine a profile of the roll-off profile to be applied to the fully viewable image to more closely match an appearance of the images. FIG. 5 shows an example of a steeper roll-off profile 500 calculated for a relatively smaller diameter pupil, and FIG. 6 shows an example of a more gradual roll-off profile 600 for a larger pupil diameter. Such an adjustment may be based upon pupil images captured in eye tracking data, based upon a detected ambient light intensity, and/or on any other suitable factors (e.g. average pupil response data, which may be based on an age of a user).

Figure 7:
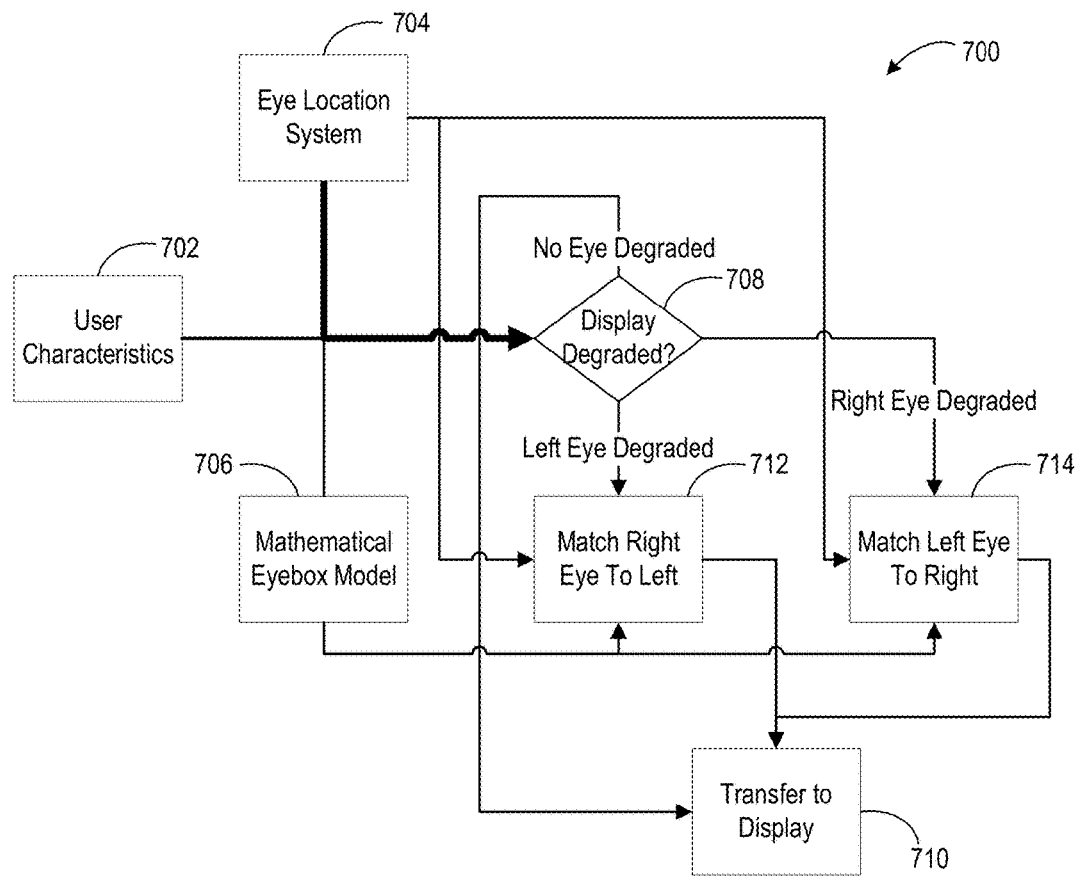
FIG. 7 is a flow diagram illustrating an example method of attenuating luminance in a portion of an image.

FIG. 7 shows a flow diagram illustrating an example method 700 of attenuating a luminance in a portion of a first eye image to more closely match the perception of a second eye image. Method 700 may be performed on any suitable near-eye display system, including but not limited to those described above.

User characteristics 702 (e.g. IPD), eye location data from the eye location system 704 (e.g. three-dimensional pupil location data), and a mathematical eyebox model 706 are used as inputs to determine at 708 whether the image for either eye is degraded by the pupil partially or fully exiting the eyebox. The eye location system 704 may provide either static or dynamic three-dimensional pupil location information, as described above. If it is determined that neither eye experiences a degraded image based on both pupils being fully within their respective eyeboxes at the determined pupil locations, then both the left eye and right eye display images are transferred to the display without modification, at 710. When it is determined that the left eye image is degraded, then at 712 the right eye is matched to the left image by attenuating a luminance of a portion of the right eye image to have a more similar appearance to the left eye image. When it is determined that the right eye image is degraded, then at 714 the left eye image is matched to the right eye image by attenuating a luminance of a portion of the left eye image.

Any suitable method may be used to attenuate a luminance of a portion of an image. In some examples, a software shader or other software algorithm may be used to apply a luminance attenuation prior to rendering. In other examples, hardware used to display the image may be controlled, for example, by controlling a display panel at the hardware level as a last-stage adjustment to the displayed image.

Figure 8:
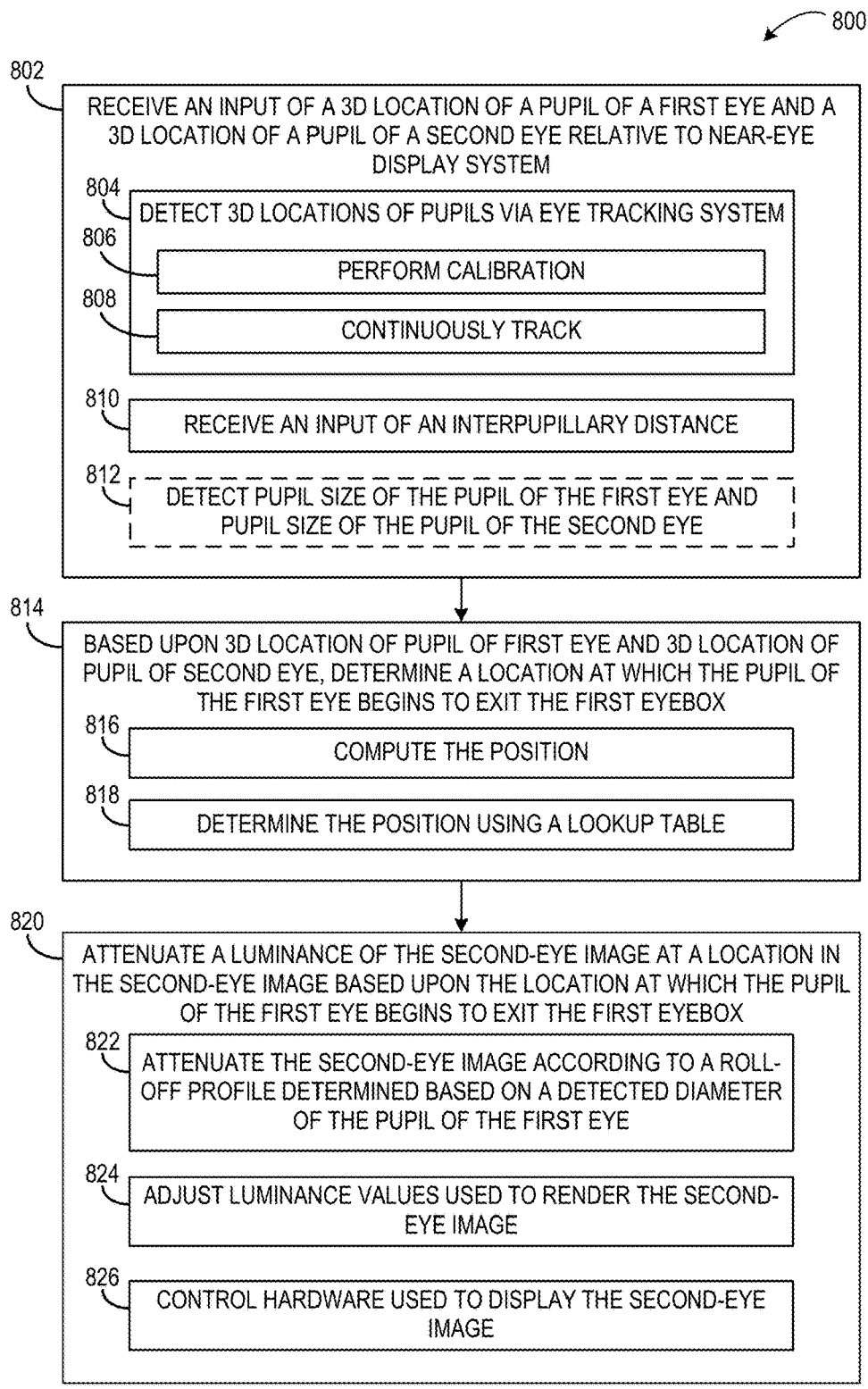
FIG. 8 is a flowchart illustrating another example method of attenuating luminance in a portion of an image.

FIG. 8 shows a flow diagram depicting another example method 800 for adjusting a displayed image to reduce binocular rivalry on a near-eye display system. Method 800 includes, at 802, receiving an input of a three-dimensional location of a pupil of a first eye and a three-dimensional location of a pupil of a second eye relative to the near-eye display system. The input of pupil location data may be received from any suitable data source. For example, the input may be received from an eye-tracking system, at 804, which may determine the three-dimensional location of each pupil during calibration 806 (e.g. performed at the beginning of a use session and possibly periodically during a use session), or may continuously track pupil locations 808. In other examples, a three-dimensional location of a pupil may be determined based on a user input of IPD, at 810, and assumed eye relief values.

In some examples, the system may optionally detect or track the pupil size of the pupil of the first eye and the pupil size of the pupil of the second eye, at 812. The pupil size may vary for a same user in the light versus the dark and/or due to other factors, and the detected pupil size may be used to compute a roll-off profile when applying a determined luminance reduction.

Method 800 further includes, at 814, based upon the three-dimensional location of the pupil of the first eye and the three-dimensional location of the pupil of the second eye, determining a location at which the pupil of the first eye begins to exit the first eyebox. In some examples, this location may be computed based upon the three-dimensional pupil location information, user characteristics, and a mathematical eyebox model, as indicated at 816. In other examples, a pre-computed look-up table may be used to determine this location, as indicated at 818.

Method 800 further includes, at 820 attenuating a luminance of a portion of the second-eye image at a location in the second-eye image based upon the location at which the pupil of the first eye begins to exit the first eyebox, thus attenuating luminance of a portion of the second-eye image in a region corresponding to a region of the first-eye image that is reduced in luminance from a perspective of the pupil of the first eye. As described above, the luminance of image may be attenuated according to a roll-off profile, as indicated at 822, which may be based on an average pupil size across a population of intended users, or which may be determined dynamically (e.g. via an eye-tracking system). Further, as pupil size may be affected by ambient brightness, in some examples the roll-off profile may be based on environment brightness and/or display brightness, e.g. as detected by a sensed ambient light level. Where the roll-off is based on a sensed ambient light level, a user's age may be used as an additional input to determine a likely pupil response of that user. The luminance adjustment may be performed at 824 via software prior to rendering or may be performed by controlling the hardware used to display the second-eye image, at 826 (e.g. by controlling a display panel at the hardware level as a last-stage adjustment).

Figure 9:
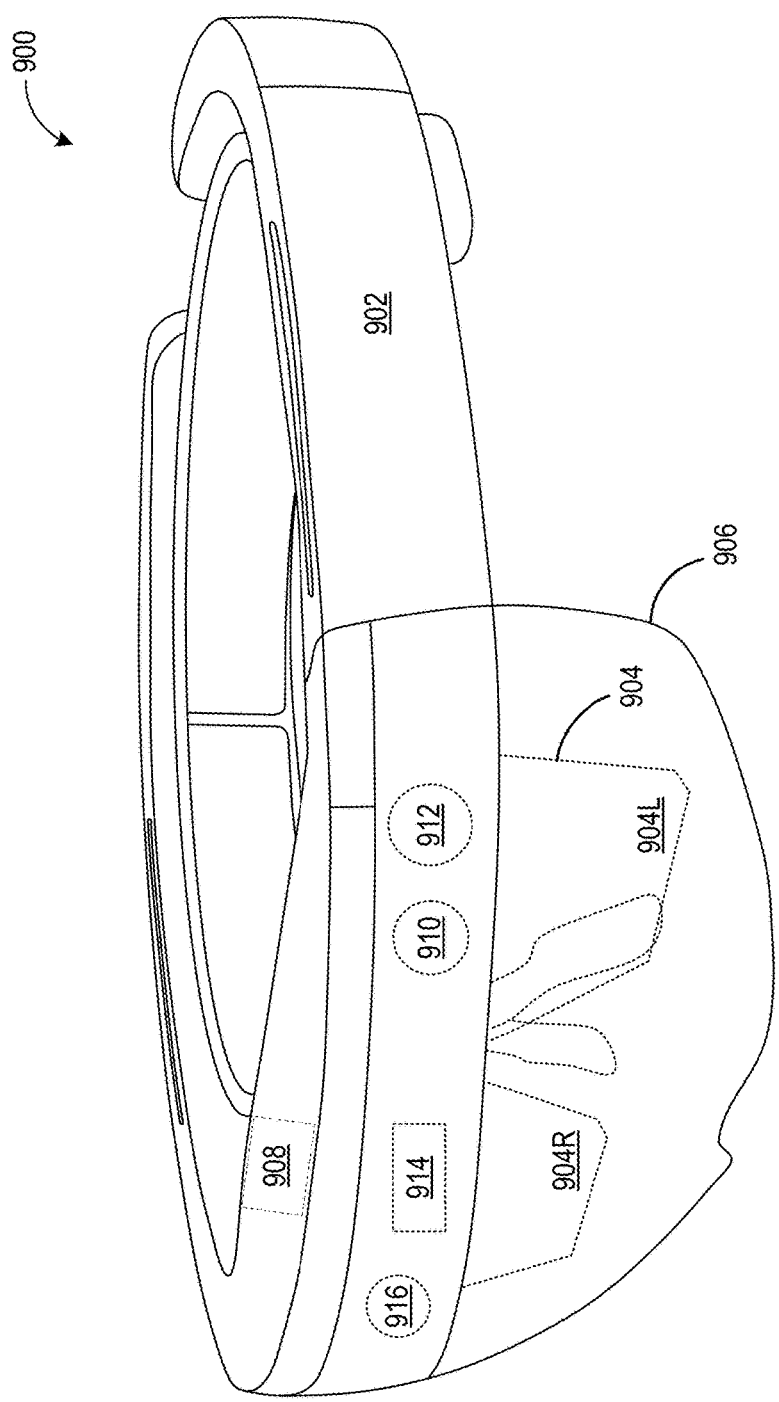
FIG. 9 shows an example head-mounted display device.

FIG. 9 shows an example near-eye display device in the form of a head-mounted display device 900 that may perform the binocular rivalry mitigation methods disclosed herein. The head-mounted display device 900 includes a frame 902 in the form of a band wearable around a head of user that supports see-through display componentry positioned nearby the user's eyes. As mentioned above, the head-mounted display device 900 may utilize augmented reality technologies to enable simultaneous viewing of virtual display imagery and a real-world background. As such, the display device 900 may generate virtual images via see-through display 904, which includes separate right and left eye displays 904R and 904L, and which may be wholly or partially transparent. The see-through display 904 may take any suitable form, such as a waveguide or prism configured to receive a generated image and direct the image towards a wearer's eye. The see-through display 904 may include a backlight and a microdisplay, such as liquid-crystal display (LCD) or liquid crystal on silicon (LCOS) display, in combination with one or more light-emitting diodes (LEDs), laser diodes, and/or other light sources. In other examples, the see-through display 904 may utilize quantum-dot display technologies, active-matrix organic LED (OLED) technology, a scanning laser display, and/or any other suitable display technologies. The see-through display 904 further may utilize pupil replication, as mentioned above, to expand an exit pupil of a display system. It will be understood that while shown in FIG. 9 as a flat display surface with left and right eye displays, the see-through display 904 may be a single display, may be curved, or may take any other suitable form.

The head-mounted display device 900 further includes an additional see-through optical component 906, shown in FIG. 9 in the form of a see-through veil positioned between the see-through display 904 and the background environment as viewed by a wearer. A controller 908 is operatively coupled to the see-through optical display 904 and to other display componentry. The controller 908 includes one or more logic devices and one or more computer memory devices storing instructions executable by the logic device(s) to enact functionalities of the display device. The display device 900 may further include a front-facing two-dimensional image camera 910 (e.g. a visible light camera and/or infrared camera), a front-facing depth camera 912, and/or an eye tracking system 914. The eye tracking system 914 may include a plurality of eye-tracking light sources (e.g. infrared light sources) directed toward a region of space intended to be occupied by a user's eye, and one or more image sensors (e.g. visible light cameras, depth cameras, infrared cameras) configured to acquire image data of a user's eyes to detect images of a pupil and of reflections of light from the eye-tracking light sources from a user's eye. The display device 900 may further include an ambient light sensor 916 that detects ambient brightness and/or display brightness. In other examples, ambient light levels may be determined from an outward-facing image sensor. The display device 900 may further include other components that are not shown, including but not limited to speakers, microphones, accelerometers, gyroscopes, magnetometers, temperature sensors, touch sensors, biometric sensors, other image sensors, energy-storage components (e.g. battery), a communication facility, a GPS receiver, etc.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
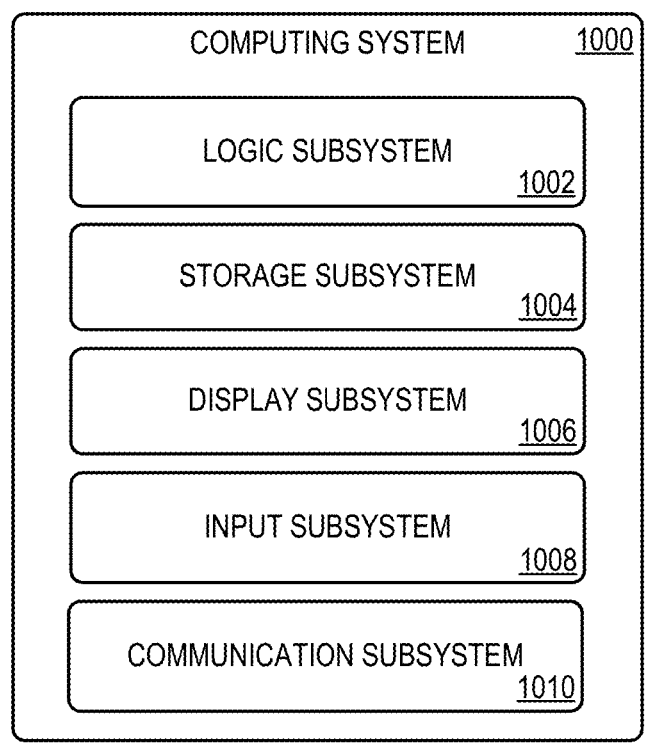
FIG. 10 shows a block diagram depicting an example computing system.

FIG. 10 schematically shows a non-limiting embodiment of a computing system 1000 that can enact one or more of the methods and processes described above. Computing system 1000 is shown in simplified form. Computing system 1000 may take the form of one or more personal computers, server computers, tablet computers, home-entertainment computers, network computing devices, gaming devices, mobile computing devices, mobile communication devices (e.g., smart phone), and/or other computing devices.

Computing system 1000 includes a logic subsystem 1002 and a storage subsystem 1004. Computing system 1000 may optionally include a display subsystem 1006, input subsystem 1008, communication subsystem 1010, and/or other components not shown in FIG. 10.

Logic subsystem 1002 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 1002 may include one or more processors configured to execute software instructions. Additionally or alternatively, the logic subsystem 1002 may include one or more hardware or firmware logic machines configured to execute hardware or firmware instructions. Processors of the logic subsystem 1002 may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic subsystem 1002 may be virtualized and executed by remotely accessible, networked computing devices configured in a cloud-computing configuration.

Storage subsystem 1004 includes one or more physical devices configured to hold instructions executable by the logic machine to implement the methods and processes described herein. When such methods and processes are implemented, the state of storage subsystem 1004 may be transformed—e.g., to hold different data.

Storage subsystem 1004 may include removable and/or built-in devices. Storage subsystem 1004 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 1004 may include volatile, nonvolatile, dynamic, static, read/write, read-only, random-access, sequential-access, location-addressable, file-addressable, and/or content-addressable devices.

It will be appreciated that storage subsystem 1004 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 1002 and storage subsystem 1004 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1006 may be used to present a visual representation of data held by storage subsystem 1004. This visual representation may take the form of a graphical user interface (GUI). As the herein described methods and processes change the data held by the storage machine, and thus transform the state of the storage machine, the state of display subsystem 1006 may likewise be transformed to visually represent changes in the underlying data. Display subsystem 1006 may include one or more display devices utilizing virtually any type of technology. Such display devices may be combined with logic subsystem 1002 and/or storage subsystem 1004 in a shared enclosure, or such display devices may be peripheral display devices.

When included, input subsystem 1008 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1010 may be configured to communicatively couple computing system 1000 with one or more other computing devices. Communication subsystem 1010 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1000 to send and/or receive messages to and/or from other devices via a network such as the Internet.

Another example provides a head-mounted display device, comprising a near-eye display system configured to output a first-eye image to a first eyebox and a second-eye image to a second eyebox, a logic device, and a storage device comprising instructions executable by the logic device to receive an input of a three-dimensional (3D) location of a pupil of a first eye and a 3D location of a pupil of a second eye relative to the near-eye display system, based upon the 3D location of the pupil of the first eye and the 3D location of the pupil of the second eye, determine a location at which the pupil of the first eye begins to exit the first eyebox, and attenuate a luminance of the second-eye image at a location in the second-eye image based upon the location at which the pupil of the first eye begins to exit the first eyebox. The head-mounted display device may additionally or alternatively include an eye tracking system, wherein the instructions are executable to detect the 3D location of the pupil of the first eye and the 3D location of the pupil of the second eye via the eye tracking system. The eye tracking system may additionally or alternatively be configured to detect a pupil size of the pupil of the first eye and a pupil size of the pupil of the second eye. The instructions may additionally or alternatively be executable to receive an input of an interpupillary distance between the pupil of the first eye and the pupil of the second eye. The instructions may additionally or alternatively be executable to attenuate the luminance of the second-eye image using a roll-off profile. The instructions may additionally or alternatively be executable to determine the roll-off profile based on a detected diameter of the pupil of the first eye. The instructions may additionally or alternatively be executable to determine the location at which the pupil of the first eye begins to exit the first eyebox using a lookup table. The instructions may additionally or alternatively be executable to attenuate the luminance of the second-eye image by adjusting luminance via software prior to rendering the second-eye image. The instructions may additionally or alternatively be executable to attenuate the luminance of the second-eye image by controlling hardware used to display the second-eye image.

Another example provides a head-mounted display device, comprising a near-eye display system configured to output a first-eye image to a first eyebox and a second-eye image to a second eyebox, an eye tracking system, a logic device, and a storage device comprising instructions executable by the logic device to, via the eye tracking system, determine a 3D location of a pupil of a first eye and a 3D location of a pupil of a second eye relative to the near-eye display system, based upon the 3D location of the pupil of the first eye and the 3D location of the pupil of the second eye, determine that the pupil of the first eye is exiting the first eyebox, based on determining that the pupil of the first eye is exiting the first eyebox, determine a region of the first-eye image that is at least partially reduced in luminance from a perspective of the pupil of the first eye, and attenuate a luminance of the second-eye image in a corresponding region of the second-eye image based on determining the region of the first-eye image. The instructions may additionally or alternatively be executable to attenuate the luminance of the second-eye utilizing a roll-off profile. The instructions may additionally or alternatively be executable to determine the roll-off profile based on a detected diameter of the pupil of the first eye. The instructions may additionally or alternatively be executable to attenuate the luminance of the second-eye image by adjusting luminance via software prior to rendering the second-eye image. The instructions may additionally or alternatively be executable to attenuate the luminance of the second-eye image by controlling hardware used to display the second-eye image.

Another example provides, on a head-mounted display device comprising a near-eye display system, a method comprising receiving an input of a 3D location of a pupil of a first eye and a 3D location of a pupil of a second eye relative to the near-eye display system, based upon the 3D location of the pupil of the first eye and the 3D location of the pupil of the second eye, determining a location at which the pupil of the first eye begins to exit the first eyebox, and attenuating a luminance of the second-eye image at a location in the second-eye image based upon the location at which the pupil of the first eye begins to exit the first eyebox. The method may additionally or alternatively include receiving an input of an interpupillary distance between the pupil of the first eye and the pupil of the second eye. Attenuating the luminance of the second-eye image may additionally or alternatively include using a roll-off profile at the location in the second-eye image based upon the location at which the pupil of the first eye is exiting the eyebox. Determining a location at which the pupil of the first eye begins to exit the first eyebox may additionally or alternatively include using a lookup table. Attenuating the luminance of the second-eye image additionally or alternatively include adjusting luminance via software prior to rendering the second-eye image. Attenuating the luminance of the second-eye image may additionally or alternatively include controlling hardware used to display the second-eye image.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A head-mounted display device, comprising:
a near-eye display system configured to output a first-eye image to a first eyebox and a second-eye image to a second eyebox;
a logic device; and
a storage device comprising instructions executable by the logic device to
receive an input of a three-dimensional (3D) location of a pupil of a first eye and a 3D location of a pupil of a second eye relative to the near-eye display system, based upon the 3D location of the pupil of the first eye and the 3D location of the pupil of the second eye, determine a location at which the pupil of the first eye begins to exit the first eyebox, and
attenuate a luminance of the second-eye image at a location in the second-eye image based upon the location at which the pupil of the first eye begins to exit the first eyebox.

2. The head-mounted display device of claim 1, further comprising an eye tracking system, wherein the instructions are executable to detect the 3D location of the pupil of the first eye and the 3D location of the pupil of the second eye via the eye tracking system.

3. The head-mounted display device of claim 2, wherein the eye tracking system is further configured to detect a pupil size of the pupil of the first eye and a pupil size of the pupil of the second eye.

4. The head-mounted display device of claim 1, wherein the instructions are executable to receive an input of an interpupillary distance between the pupil of the first eye and the pupil of the second eye.

5. The head-mounted display device of claim 1, wherein the instructions are executable to attenuate the luminance of the second-eye image using a roll-off profile.

6. The head-mounted display device of claim 5, wherein the instructions are executable to determine the roll-off profile based on a detected diameter of the pupil of the first eye.

7. The head-mounted display device of claim 1, wherein the instructions are executable to determine the location at which the pupil of the first eye begins to exit the first eyebox using a lookup table.

8. The head-mounted display device of claim 1, wherein the instructions are executable to attenuate the luminance of the second-eye image by adjusting luminance via software prior to rendering the second-eye image.

9. The head-mounted display device of claim 1, wherein the instructions are executable to attenuate the luminance of the second-eye image by controlling hardware used to display the second-eye image.

10. A head-mounted display device, comprising:
a near-eye display system configured to output a first-eye image to a first eyebox and a second-eye image to a second eyebox;
an eye tracking system;
a logic device; and
a storage device comprising instructions executable by the logic device to
via the eye tracking system, determine a 3D location of a pupil of a first eye and a 3D location of a pupil of a second eye relative to the near-eye display system,
based upon the 3D location of the pupil of the first eye and the 3D location of the pupil of the second eye, determine that the pupil of the first eye is exiting the first eyebox,
based on determining that the pupil of the first eye is exiting the first eyebox, determine a region of the first-eye image that is at least partially reduced in luminance from a perspective of the pupil of the first eye, and
attenuate a luminance of the second-eye image in a corresponding region of the second-eye image based on determining the region of the first-eye image.

11. The head-mounted display device of claim 10, wherein the instructions are executable to attenuate the luminance of the second-eye utilizing a roll-off profile.

12. The head-mounted display device of claim 11, wherein the instructions are executable to determine the roll-off profile based on a detected diameter of the pupil of the first eye.

13. The head-mounted display device of claim 10, wherein the instructions are executable to attenuate the luminance of the second-eye image by adjusting luminance via software prior to rendering the second-eye image.

14. The head-mounted display device of claim 10, wherein the instructions are executable to attenuate the luminance of the second-eye image by controlling hardware used to display the second-eye image.

15. On a head-mounted display device comprising a near-eye display system, a method comprising:
receiving an input of a 3D location of a pupil of a first eye and a 3D location of a pupil of a second eye relative to the near-eye display system,
based upon the 3D location of the pupil of the first eye and the 3D location of the pupil of the second eye, determining a location at which the pupil of the first eye begins to exit the first eyebox, and
attenuating a luminance of the second-eye image at a location in the second-eye image based upon the location at which the pupil of the first eye begins to exit the first eyebox.

16. The method of claim 15, further comprising receiving an input of an interpupillary distance between the pupil of the first eye and the pupil of the second eye.

17. The method of claim 15, wherein attenuating the luminance of the second-eye image comprises using a roll-off profile at the location in the second-eye image based upon the location at which the pupil of the first eye is exiting the eyebox.

18. The method of claim 15, wherein determining a location at which the pupil of the first eye begins to exit the first eyebox comprises using a lookup table.

19. The head-mounted display device of claim 15, wherein attenuating the luminance of the second-eye image comprises adjusting luminance via software prior to rendering the second-eye image.

20. The head-mounted display device of claim 15, wherein attenuating the luminance of the second-eye image comprises controlling hardware used to display the second-eye image.

* * * * *